United States Patent
Lee et al.

(10) Patent No.: US 12,432,548 B2
(45) Date of Patent: Sep. 30, 2025

(54) METHOD OF MANAGING ELECTRONIC DEVICES BASED ON GROUP ACCOUNT AND ELECTRONIC DEVICE FOR PROVIDING THE SAME

(71) Applicant: Samsung Electronics Co., Ltd., Suwon-si (KR)

(72) Inventors: Lyesuk Lee, Suwon-si (KR); Gajin Song, Suwon-si (KR); Hyosung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 17/899,090

(22) Filed: Aug. 30, 2022

(65) Prior Publication Data

US 2023/0047571 A1    Feb. 16, 2023

Related U.S. Application Data

(63) Continuation of application No. PCT/KR2022/011870, filed on Aug. 9, 2022.

(30) Foreign Application Priority Data

Aug. 10, 2021    (KR) .................. 10-2021-0105158

(51) Int. Cl.
*H04W 8/18*      (2009.01)
*H04W 4/80*      (2018.01)
*H04W 76/18*     (2018.01)

(52) U.S. Cl.
CPC ............. *H04W 8/186* (2013.01); *H04W 4/80* (2018.02); *H04W 76/18* (2018.02)

(58) Field of Classification Search
CPC ....... H04W 4/80; H04W 76/18; H04W 8/186; H04W 8/18
See application file for complete search history.

(56) References Cited

U.S. PATENT DOCUMENTS

2015/0350051 A1    12/2015    Lincoln et al.
2016/0044728 A1    2/2016     Hong et al.
(Continued)

FOREIGN PATENT DOCUMENTS

CN        113169910 A    7/2021
JP    2015-050537 A    3/2015
(Continued)

OTHER PUBLICATIONS

CN 204887145 U), Zhu, Position Determining For electronic device, Dec. 2015, pp. 1-14 (Year: 2015).*
(Continued)

*Primary Examiner* — Keith Ferguson
(74) *Attorney, Agent, or Firm* — Jefferson IP Law, LLP

(57) ABSTRACT

An electronic device is provided. The electronic device includes a communication circuit, and a processor, wherein the processor may be configured to receive a connection request with a short-range communication device through the communication circuit in a state registered with a first account in a location finding service, to request configuration information related to the location finding service to the short-distance communication device, to receive configuration information stored based on a second account of the short-range communication device from the short-range communication device, to identify whether group account information corresponding to the first account and group account information corresponding to the second account match, and to establish a connection with the short-range communication device while maintaining the second account of the short-range communication device in response to matching of group account information of the short-range communication device and the electronic device.

18 Claims, 12 Drawing Sheets

(56) References Cited

U.S. PATENT DOCUMENTS

| | | |
|---|---|---|
| 2018/0204186 A1 | 7/2018 | Kwak |
| 2018/0295598 A1 | 10/2018 | Donnellan et al. |
| 2020/0074822 A1 | 3/2020 | Ingrassia, Jr. et al. |
| 2020/0107164 A1 | 4/2020 | Lopatin et al. |
| 2020/0128620 A1 | 4/2020 | Han et al. |
| 2020/0301720 A1 | 9/2020 | Choi |
| 2020/0404610 A1 | 12/2020 | Crouch et al. |
| 2021/0127249 A1 | 4/2021 | Oh et al. |
| 2022/0052869 A1 | 2/2022 | Garbosa et al. |

FOREIGN PATENT DOCUMENTS

| | | |
|---|---|---|
| KR | 10-0658579 B1 | 12/2006 |
| KR | 10-2007-0039250 A | 4/2007 |
| KR | 10-2015-0070836 A | 6/2015 |
| KR | 10-2016-0000616 A | 1/2016 |
| KR | 10-2018-0085558 A | 7/2018 |
| KR | 10-2020-0068300 A | 6/2020 |
| KR | 10-2021-0050390 A | 5/2021 |
| KR | 10-2262826 B1 | 6/2021 |
| KR | 10-2022-0017326 A | 2/2022 |

OTHER PUBLICATIONS

CN 112672278 A) Fan et al., Locating Method and Device of Wearable Device, Apr. 2021, pp. 1-12 (Year: 2021).*

Extended European Search Report dated Jun. 24, 2024, issued in European Application No. 22856186.6-1206.

Australian Office Action dated Aug. 31, 2024, issued in Australian Application No. 2022328089.

Partial Supplementary European Search Report dated Apr. 2, 2024, issued in European Patent Application No. 22856186.6-1213.

International Search Report dated Nov. 14, 2022, issued in International Patent Application No. PCT/KR2022/011870.

* cited by examiner

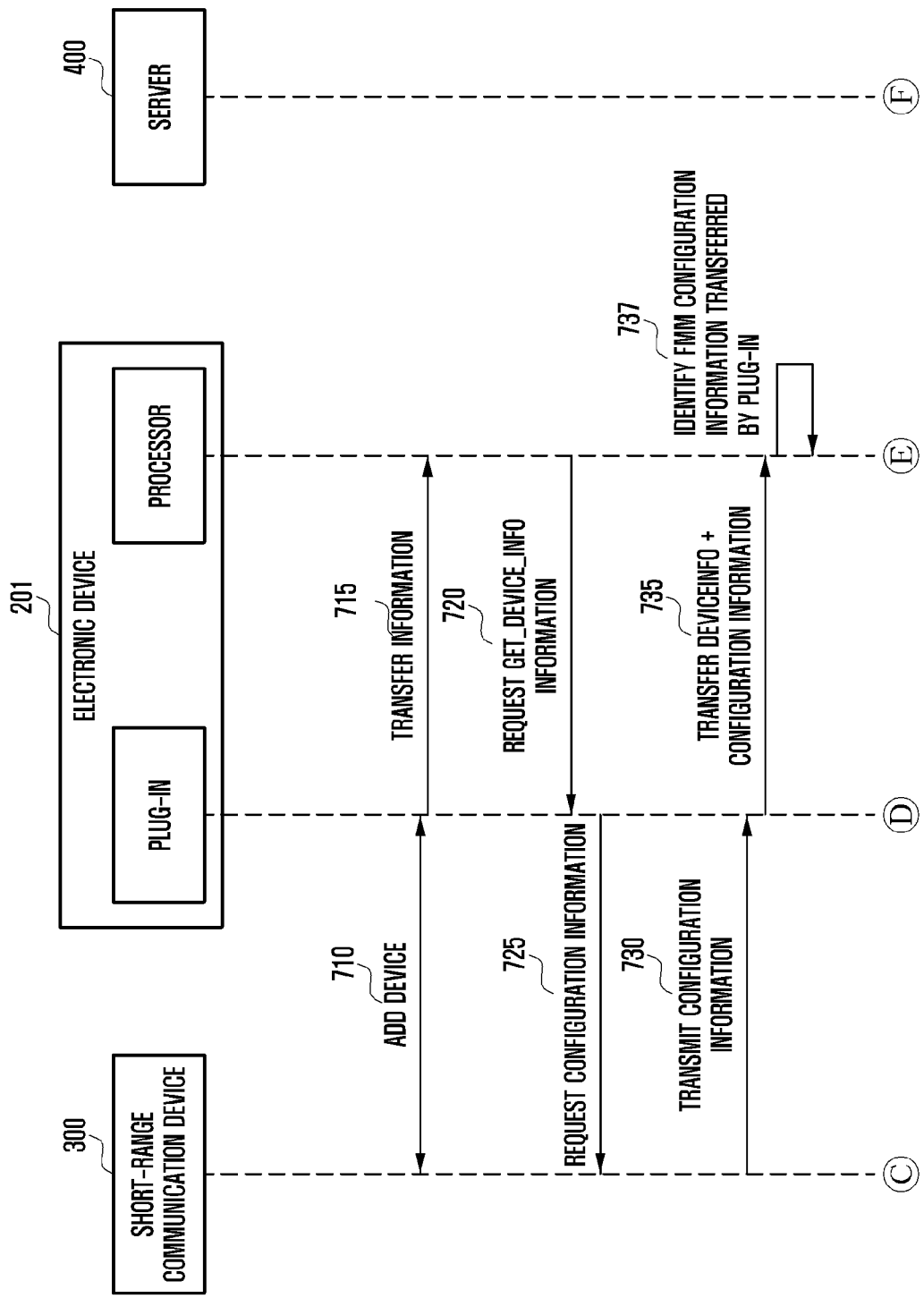

METHOD OF MANAGING ELECTRONIC DEVICES BASED ON GROUP ACCOUNT AND ELECTRONIC DEVICE FOR PROVIDING THE SAME

CROSS-REFERENCE TO RELATED APPLICATION(S)

This application is a continuation application, claiming priority under § 365 (c), of an International application No. PCT/KR2022/011870, filed on Aug. 9, 2022, which is based on and claims the benefit of a Korean patent application number 10-2021-0105158, filed on Aug. 10, 2021, in the Korean Intellectual Property Office, the disclosure of which is incorporated by reference herein in its entirety.

TECHNICAL FIELD

The disclosure relates to a method of managing electronic devices based on a group account and a device for providing the same.

BACKGROUND ART

Electronic devices provide a service for identifying a location of a lost electronic device in preparation for loss. For example, an electronic device may collect a location of the lost electronic device and provide location information to a user (or other electronic device) under conditions in which a server (e.g., find my mobile (FMM) server, finding server) for supporting a location identification service of the lost device and an electronic device (or lost device) capable of direct communication with the server are ON. The server may authenticate a user who has lost the electronic device through a user account, collect location information of the electronic device linked to the user account, and provide guide information on a lost location to the user. As described above, the electronic device that directly communicates with a server to be linked to an account system, as in a smart phone may provide a location identification service.

When short-distance communication devices (e.g., wireless earphones, earbuds, wearable devices, and stylus pens) are connected to an electronic device (e.g., smart phone), the short-distance communication devices may be registered in the server with a user account of the electronic device.

Short-range communication devices may process find my mobile (FMM) configuration information related to a location identification service based on a user account of an electronic device connected thereto. For example, in the location identification service of short-range communication devices that do not communicate directly with the server, when the short-range communication device (in other words, a lost device) transmits identification information thereof to a peripheral device, the peripheral device transmits location information thereof and identification information of the short-distance communication device to the server, and the server identifies an electronic device of a user account processed upon registering the short-distance communication device, and provides location information of the short-range communication device to the electronic device of the identified user account.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

However, after the short-range communication device is lost, if the short-range communication device is newly paired with another electronic device, the short-range communication device may be re-registered in the server with a user account of newly paired another electronic device. For this reason, if the short-distance communication device is connected to another electronic device, the short-distance communication device is automatically registered with an account of the other electronic device, so that there occurs a situation in which an actual owner cannot find the lost short-distance communication device. In other words, whenever a pairing connection is changed in the short-range communication devices, a user account in the server is also changed, so that it is difficult to identify a location of the short-distance communication devices when the short-range communication devices are lost.

Further, whenever the short-range communication device is re-registered as an electronic device of a different account, the server re-issues FMM configuration information, thus, unnecessary traffic occurs in the server.

Short-distance communication devices may be shared and used with electronic devices of other users (e.g., family members and friends) other than an owner. When short-distance communication devices are shared and used with the owner and other users, it is difficult to manage devices due to occurring frequently account change or re-registration of the short-range communication devices.

Aspects of the disclosure are to address at least the above-mentioned problems and/or disadvantages and to provide at least the advantages described below. Accordingly, an aspect of the disclosure is to provide a location finding service of the short-range communication device through the electronic devices in the group account, even if an electronic device connected to the short-range communication devices is changed by managing short-range communication devices based on a group account instead of based on a user account.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication circuit, and a processor, wherein the processor may be configured to receive a connection request with a short-range communication device through the communication circuit in a state registered with a first account in a location finding service, to request configuration information related to the location finding service to the short-distance communication device, to receive configuration information stored based on a second account of the short-range communication device from the short-range communication device, to identify whether group account information corresponding to the first account and group account information corresponding to the second account match, and to establish a connection with the short-range communication device while maintaining the second account of the short-range communication device in response to matching of group account information of the short-range communication device and the electronic device.

In accordance with another aspect of the disclosure, a method of managing a short-range communication device based on a group account in an electronic device is provided. The method includes receiving a connection request with a short-range communication device in a state in which the electronic device is registered with a first account in a location finding service, requesting configuration information related to a location finding service to the short-distance communication device, receiving, from the short-range communication device, stored configuration information based on a second account of the short-range communication device, identifying whether group account information corresponding to the first account and group account information corresponding to the second account match, and establishing a connection with the short-range communication device while maintaining the second account of the short-range communication device in response to matching group account information of the short-range communication device and the electronic device.

Advantageous Effects of Invention

According to various embodiments, by generating a group account, and integrally managing user accounts belonging to the generated group account and electronic devices and short-distance communication devices linked to the user accounts, it is possible to prevent unnecessary procedures of account change, re-registration operation, and/or configuration information change operation of short-range communication devices that do not directly communicate with a server (e.g., FMM server, finding server) supporting a location identification service.

According to various embodiments, it is possible to provide a location identification service for not only an electronic device included in a group account, but also short-distance communication devices connected to the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which:

FIGS. 7A, 7B, 7C, and 7D illustrate a method of processing a connection between an electronic device and a short-range communication device in a network system according to various embodiments of the disclosure;

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
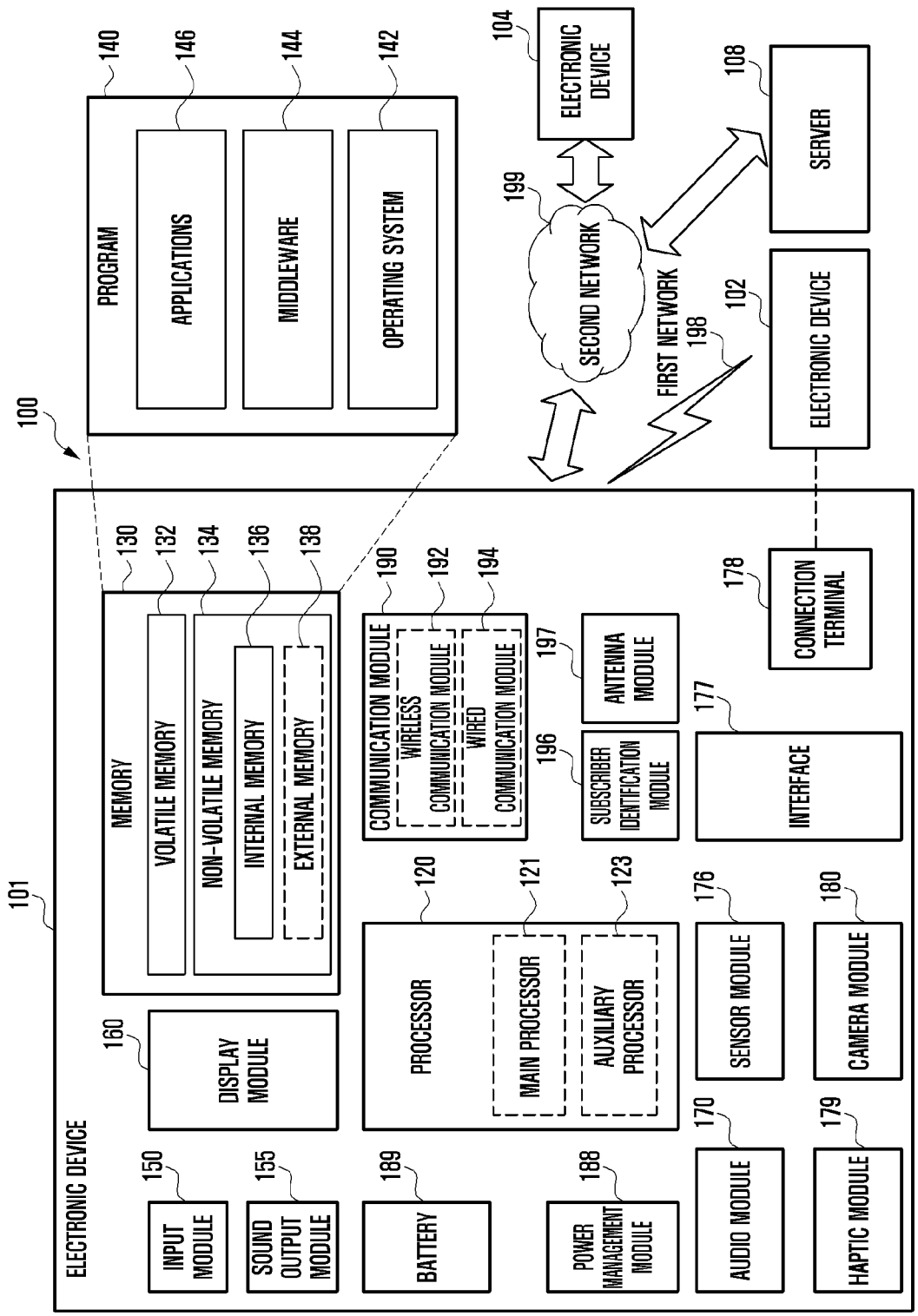
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ (BT), wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
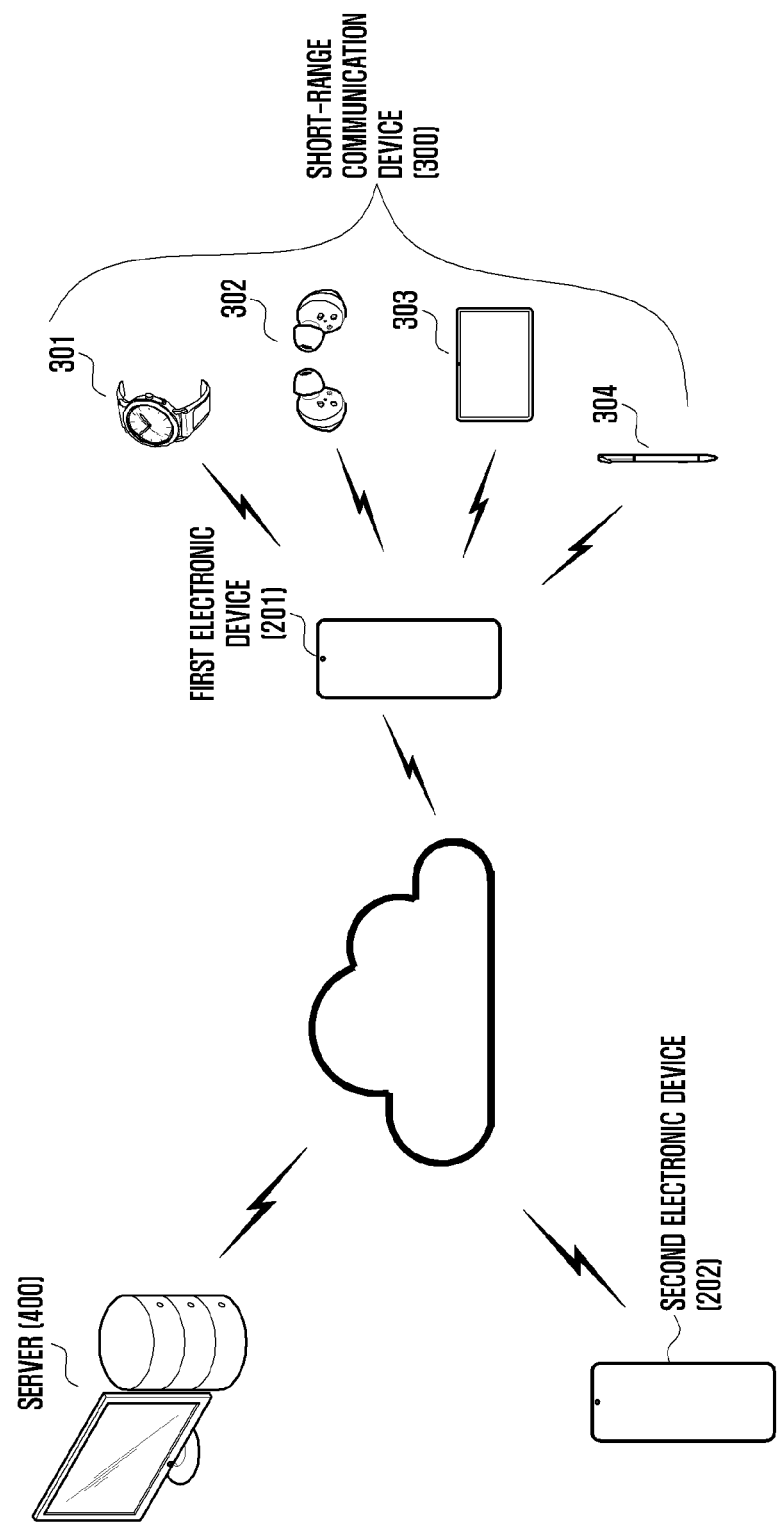
FIG. 2 illustrates a network system of electronic devices according to an embodiment of the disclosure.

FIG. 2 illustrates a network system of electronic devices according to an embodiment of the disclosure.

Referring to FIG. 2, a network system according to an embodiment may include a first electronic device 201 (e.g., the electronic device 101 of FIG. 1), a second electronic device 202, short-range communication devices 300, and a server 400.

The first electronic device 201, the second electronic device 202, and the short-range communication devices 300 may correspond to the electronic device 101 of FIG. 1 or may be a device including a part of a configuration of the electronic device 101 of FIG. 1. The server 400 may correspond to the server 108 of FIG. 1.

For example, the first electronic device 201 and the second electronic device 202 may be mobile communication devices such as a smart phone. A first short-range communication device 301 may be a wearable device such as a smart watch. A second short-range communication device 302 may be an audio output device such as a Bluetooth earphone or a Bluetooth speaker. A third short-range communication device 303 may be a notebook computer or a tablet computer. A fourth short-range communication device 304 may be an electronic input device such as a stylus pen. In addition to the short-range communication device illustrated in FIG. 2, the user may use various types of short-range communication devices including a communication function in association with the electronic device (e.g., the first electronic device 201 and the second electronic device 202).

The first electronic device 201 and the second electronic device 202 may be connected to the server 400 through a second network (e.g., the second network 199 of FIG. 1) (e.g., cellular network).

The first electronic device 201 and the short-range communication devices 300 may be connected to each other through a first network (e.g., the first network 198 of FIG. 1) (e.g., short-range wireless communication network). For example, the first network may include Bluetooth, Bluetooth Low Energy (BLE), Wi-Fi direct, near field communication (NFC), ultra-wide band (UWB) communication, or infrared (Infra-red) communication. In some embodiments, the short-range wireless communication network may include a mesh network (e.g., zigbee, and Z-Wave).

According to an embodiment, the server 400 may be a server (e.g., find my mobile (FMM) server, find my everything (FME) server, finding server, or location identification service server) for managing a plurality of electronic devices (e.g., the first electronic device 201, the second electronic device 202, and the short-range communication devices 300) with a user account and supporting a location identification service function of a lost device.

According to an embodiment, the first electronic device 201, the second electronic device 202, and the short-range communication devices 300 may be registered in the server 400 based on a user account.

For example, the first electronic device 201 and the short-range communication devices 300 (e.g., at least one of the first short-range communication device (i.e., electronic device 301), the second short-range communication device 302, the third short-range communication device 303, or the fourth short-range communication devices 304) may be registered in the server 400 with a first account, and the second electronic device 202 may be registered in the server 400 with a second account.

According to an embodiment, the server 400 may provide a function of managing a plurality of electronic devices with a group account. When the user loses any one device included in the group account based on the group account, the server 400 may provide a function of identifying a location of the lost device and sharing a location of the lost device to all electronic devices included in the group account.

The server 400 may manage the first electronic device 201 registered with the first account and the second electronic device 202 registered with the second account with one group account. For example, the server 400 may allocate identification information (e.g., group identification (ID)) of the group account, and register and manage user identification information (e.g., user 1 ID) of the first account, user identification information (e.g., user 2 ID) of the second account in relation to the identification information of the group account, device identification information (e.g., device 1 ID) registered with the first account, and/or device identification information (e.g., device 2 ID) registered with the second account. The server 400 may provide identification information of the group account and a device list of devices registered with the group account to the electronic devices included in the group account according to a request. When it is requested to share location information of the device registered with a group account, the server 400 may provide location information to electronic devices included in the group account.

For example, when the second electronic device 202 requests location information of the short-range communication devices 300 registered with the first account of the first electronic device 201, the server 400 may identify that the second electronic device 202 and the first electronic device 201 are devices included in the group account and provide location information of the short-range communication devices 300 registered with the first account to the second electronic device 202.

Figure 3:
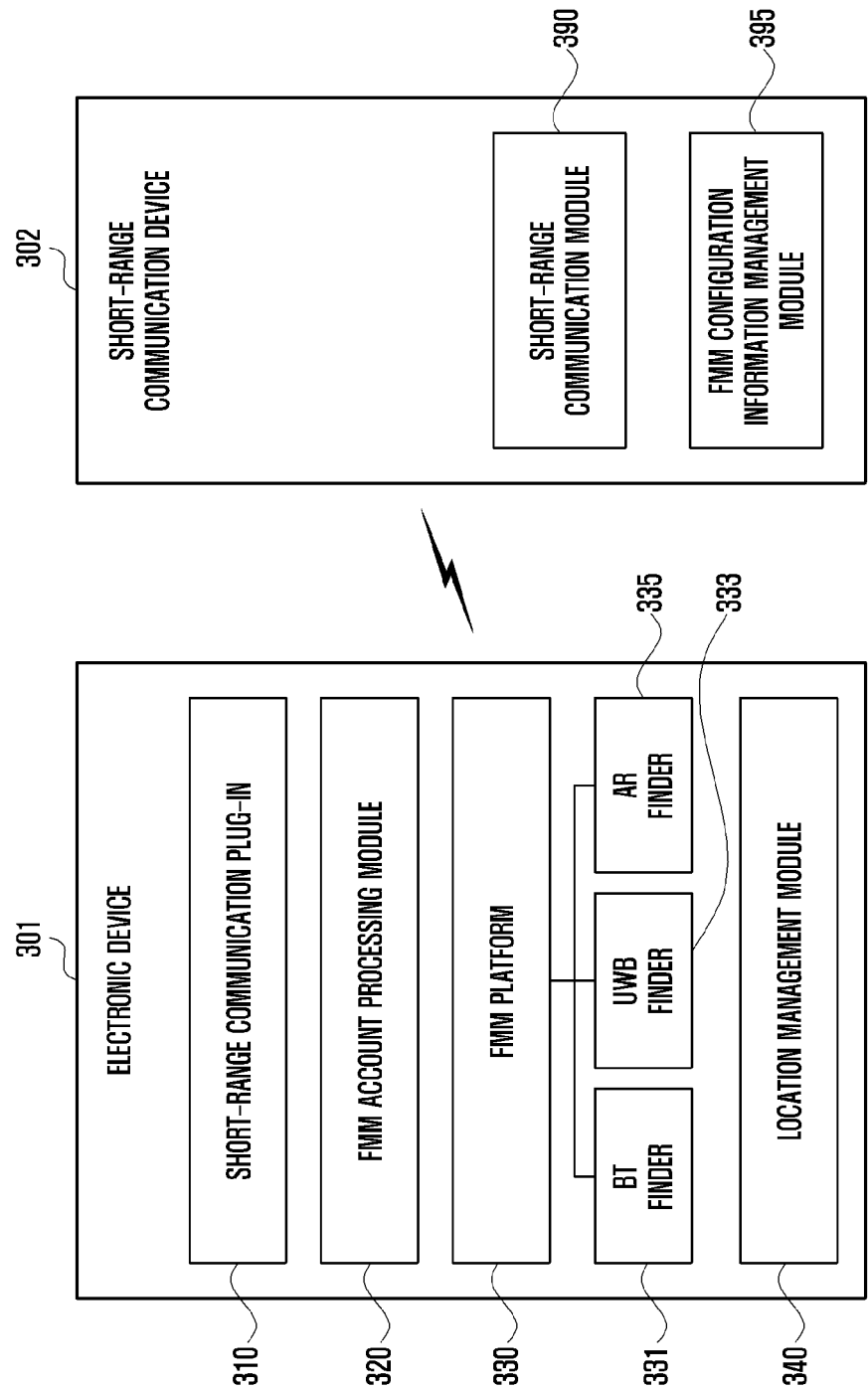
FIG. 3 illustrates modules of an electronic device and a short-range communication device according to an embodiment of the disclosure.

FIG. 3 illustrates modules of an electronic device and a short-range communication device according to an embodiment of the disclosure.

Referring to FIG. 3, for example, an electronic device 301 (e.g., the first electronic device 201 or the second electronic device 202 of FIG. 2 or the electronic device 101 of FIG. 1) may include a short-range communication plug-in 310, a find my mobile (FMM) account processing module 320, an FMM platform 330, and a location management module 340. Functions or operations described in FIG. 3 may be understood as functions performed by the processor (e.g., the processor 120 of FIG. 1) of the electronic device 301. The processor 120 may execute instructions stored in a memory (e.g., the memory 130 of FIG. 1) so as to implement a software module, and control hardware (e.g., the communication module 190 of FIG. 1) associated with a function.

The short-range communication plug-in 310 may be a module for a connection with a short-range communication device 302 (e.g., the short-range communication device 300 of FIG. 2). For example, the electronic device 301 may install and drive the short-range communication plug-in 310 in relation to the short-range communication device 302. The short-range communication plug-in 310 may provide a function of searching for the short-range communication device 302 within a preconfigured distance of the electronic device 301 or a function of configuring a connection with the short-range communication device 302.

The FMM account processing module 320 may be a module for registering the short-range communication device 302 connected to the electronic device 301 in a find my mobile (FMM) server (e.g., the server 400 of FIG. 2) for providing a location identification service of the lost device and for processing data with the FMM server. According to some embodiments, the FMM account processing module 320 may further include an FMM plug-in (not illustrated) installed and driven in relation to the FMM server. The FMM account processing module 320 may be executed in association with an application supporting a location identification service. The FMM account processing module 320 may provide a function of generating a user account in association with the FMM server, a function of registering a device, a function of generating a group account, and a function of processing FMM configuration information.

According to an embodiment, the FMM account processing module 320 may access the FMM server through an FMM plug-in (not illustrated), generate a user account of the electronic device 301, and register the electronic device 301 in the FMM server based on the user account. When a user account is registered in the FMM server, the FMM account processing module 320 may transmit device information of the electronic device 301 to the FMM server.

Device information may include, for example, at least one of a device type (e.g., smartphone), device identification information (e.g., model name or device identification (ID), device manufacturer, device hardware information (e.g., processor performance, memory capacity, battery capacity), software information (e.g., operating system type and version, firmware information, installation application information, support service information), or communication performance information (e.g., whether Bluetooth is supported, whether BLE is supported, whether UWB is supported, whether cellular is supported, whether Wi-Fi is supported, whether NFC is supported, and/or whether MST is supported).

According to an embodiment, the FMM account processing module 320 may register the short-range communication device 302 connected to the electronic device 301 in the FMM server with a user account of the electronic device 301. When the short-range communication device 302 is registered in the FMM server, the FMM account processing module 320 may transmit device information of the short-range communication device 302 to the FMM server.

The FMM server may register or add the short-range communication device 302 to the user account of the electronic device 301. In some cases, the FMM server may exclude (or delete) the short-range communication device 302 registered in the user account.

The FMM server may manage electronic devices and short-range communication devices registered in the FMM server based on device identification information (device ID) of the electronic device 301 and user identification information (user ID) corresponding to a user account.

According to an embodiment, the FMM account processing module 320 may communicate with the FMM server to configure FMM configuration information in a process (or onboarding) of registering the short-range communication device 302 in the FMM server and transmit the FMM configuration information to the short-range communication device 302 through the short-range communication plug-in 310. For example, the FMM configuration information may include a token including at least one of a serial number, whether offline location finding is supported, or device ownership authentication information. In some cases, the FMM configuration information may further include identification information of the group account and a device list of the group account.

According to an embodiment, the FMM account processing module 320 may support generation of a group account for user accounts in association with the FMM server and support to manage electronic devices and short-range communication devices based on the generated group account.

According to an embodiment, when connecting with the short-range communication device 302, the FMM account processing module 320 may handle differently a connection operation with the short-range communication device 302 according to whether existence of the FMM configuration information and the user account stored in the short-range communication device 302. Connection operations according to conditions upon connecting to the short-range communication device 302 will be described in detail with reference to FIGS. 6 and 7A to 7D.

The FMM platform (or finding platform) 330 may perform a function of finding a lost device. The FMM platform 330 may support a location finding service based on a user account or a group account. The FMM platform 330 may share location finding information of the lost device with all electronic devices registered with the group account including the lost device.

The FMM platform 330 may control hardware to find the lost device according to a distance from the lost device. For example, the FMM platform 330 may operate together with a BT finder 331, a UWB finder 333, and/or an augmented reality (AR) finder 335. The BT finder 331 may control a Bluetooth communication circuit, the UWB finder 333 may control a UWB communication circuit, and the AR finder 335 may control a display (e.g., the display module 160 of FIG. 1).

In an embodiment, when a distance between the electronic device 301 and the lost device (e.g., the short-range communication device 302) is a first distance (e.g., within about 100 m), the BT finder 331 may operate. When a distance between the electronic device 301 and the lost device corresponds to a first distance, the FMM platform 330 may control the BT finder 331 to receive a packet from the lost device using a short-range communication circuit that supports Bluetooth communication and/or BLE communication or to establish a short-range communication connection with the lost device.

In an embodiment, when a distance between the electronic device 301 and the lost device is a second distance (e.g., within about 50 m) smaller than the first distance, the UWB finder 333 may operate. The FMM platform 330 may control the UWB finder 333 to activate a UWB communication circuit connected to a plurality of UWB antennas so as to receive a signal of a UWB channel used for positioning. The FMM platform 330 may receive a UWB signal received from the lost device using the UWB communication circuit, and estimate a location of the lost device based on an arrival time and/or an arrival angle of a signal received by each of the plurality of UWB antennas.

In an embodiment, when the lost device is in a short distance, by implementing augmented reality on a display, the AR finder 335 may visually assist the user in finding the lost device. The term "short-distance" may be substantially the same as the second distance or a third distance shorter than the second distance. The FMM platform 330 may control the AR finder 335 to output image data obtained through a camera (e.g., the camera module 180 of FIG. 1) to the display and to display a location of the lost device identified through the UWB finder 333 on a screen output to the display. Further, when the electronic device 301 does not receive a UWB signal from the lost device (e.g., when reception sensitivity is less than or equal to a threshold value), the AR finder 335 may guide through the display so that the electronic device 301 has a posture (angle) appropriate for receiving the UWB signal.

In an embodiment, the BT finder 331, the UWB finder 333, and/or the AR finder 335 included in the FMM platform 330 may operate substantially simultaneously or selectively based on a distance to the lost device. For example, when the distance between the electronic device 301 and the lost device is a second distance (e.g., within about 50 m), the BT finder 331 and the UWB finder 333 operate substantially simultaneously or the UWB finder 333 may selectively operate.

The location management module 340 may manage a current location of the electronic device 301 obtained from the FMM server, a current location of the lost device, and/or a change history of the location. Further, the location management module 340 may control a location measuring circuit such as a global positioning system (GPS) included in the electronic device 301 to identify and/or manage a location of the electronic device 101.

The location management module 340 may identify locations of all electronic devices belonging to the group account as well as the electronic device 301 or the short-range communication device 302 registered with a user account of the electronic device 301 registered in the FMM server and manage a change history of the location.

According to an embodiment, the short-range communication device 302 may include a short-range communication module 390 and an FMM configuration information management module 395.

The short-range communication module 390 may form a short-range communication channel with the electronic device 301. The short-range communication module 390 may be connected to the electronic device 301 using a short-range communication circuit supporting Bluetooth communication and/or BLE communication.

When a connection operation with the electronic device 301 is performed and the short-range communication device 302 is registered in the FMM server, the short-range communication module 390 may transmit and receive data to and from the electronic device 301.

For example, when a communication channel with the electronic device 301 is formed, the short-range communication module 390 may transmit device information of the short-range communication device 302 to the electronic device 301.

For another example, when the short-range communication module 390 registers the short-range communication device 302 in the FMM server through the electronic device 301, the short-range communication module 390 may receive FMM configuration information from the electronic device 301.

The FMM configuration information management module 395 may store the FMM configuration information transmitted from the electronic device 301. The FMM configuration information management module 395 may provide FMM configuration information to the electronic device 301 according to a request from the electronic device 301 connected to the short-range communication device 302.

The FMM configuration information management module 395 may delete the stored FMM configuration information according to a deletion request from the electronic device 301.

According to an embodiment, when the FMM configuration information management module 395 receives group account information (e.g., group account ID, device list of group accounts) from the short-range communication device 302 and the electronic device 301, the FMM configuration information management module 395 may add group account information to FMM configuration information.

Figure 4:
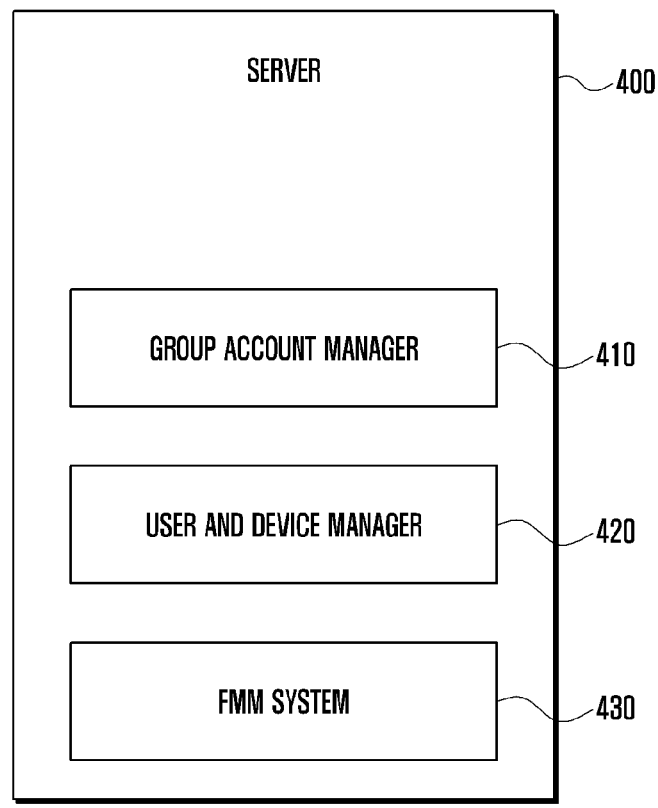
FIG. 4 illustrates modules related to a function of a server according to an embodiment of the disclosure.

FIG. 4 illustrates modules related to a function of a server according to an embodiment of the disclosure.

Referring to FIG. 4, according to an embodiment, a server 400 (e.g., FMM server) may include a group account manager 410, a user and device manager 420, and a find my everything (FME) system (or finding system) 430.

The group account manager 410 may manage devices registered (or connected) with user accounts for each user account registered in the server 400. For example, when a first device, a second device, and a third device are registered with a first account, although the group account manager 410 receives a request related to a second device from the first device, the first device and the second device are linked to the same first account; thus, it is possible to allow the first device to access information related to the second device.

The group account manager 410 may group user accounts to manage them with one group account and manage devices included in the group account. For example, the first device, the second device, and the third device may be registered with a first account, and a fourth device may be registered with a second account. The group account manager 410 may integrate and manage the first account and the second account into one group account. The group account manager 410 may store identification information of the group account, and register and manage user identification information of the first account, device identification information registered with the first account, user identification information of the second account, and device identification information registered with the second account in the identification information of the group account.

The user and device manager 420 may manage registration, addition, deletion, and/or modification of user identification information based on a user account or a group account. Further, the user and device manager 420 may manage registration, addition, deletion, and/or modification of device identification information of devices registered with a group account.

The FME system 430 may perform processing for providing a location finding service of a lost device. For example, when the FME system 430 receives a request to disclose location information on the lost device, the FME system 430 may identify a registered group account of the lost device, and transmit location information of the lost device to at least one of all electronic devices registered corresponding to user accounts included in the group account.

An electronic device (the electronic device 201 of FIG. 2 and the electronic device 301 of FIG. 3) according to various embodiments may include a communication module (e.g., the communication module 190 of FIG. 1, the short-range communication plug-in 310 of FIG. 3) and a processor (e.g., the processor 120 of FIG. 1, the FMM account processing module 320 of FIG. 3), wherein the processor 120 may be configured to receive a connection request with a short-range communication device (e.g., the short-range communication device 302 of FIG. 3) through the communication module in a state registered with a first account in the location finding service, to request configuration information related to the location finding service to the short-distance communication device, to receive configuration information stored based on a second account of the short-range communication device from the short-range communication device, to identify whether group account information corresponding to the first account and group account information corresponding to the second account match, and to establish a connection with the short-range communication device while maintaining the second account of the short-range communication device in response to matching of group account information of the short-range communication device and the electronic device.

According to various embodiments, when group account information corresponding to the first account and group account information corresponding to the second account do not match, the processor 120 may be configured to re-register the short-range communication device with the first account in the location finding service and to transmit the reconfigured configuration information to the short-distance communication device so as to update the short-range communication device to configuration information reconfigured based on the first account.

An electronic device (e.g., the electronic device 201 of FIG. 2 and the electronic device 301 of FIG. 3) according to various embodiments may include a display (e.g., the display module 160 of FIG. 1), a communication module (e.g., the communication of FIG. 1, the short-range communication plug-in 310 of FIG. 3), and a processor (e.g., the processor 120 of FIG. 1, the FMM account processing module 320 of FIG. 3), wherein the processor may be configured to register the electronic device to a server (e.g., the server 400 of FIG. 2 and the server 400 of FIG. 4) with a first account in the location finding service based on an application supporting the location finding service, to display a user interface for generating a group account based on the application on the display, to request a contact list in response to a group generation request, to transmit an invitation message to a second electronic device of the selected member in response to a user input selecting a group member from the contact list, to generate a group account including the first account and a second account corresponding to the second electronic device in response to receiving an approval message in response to an invitation from the second electronic device, and to register the group account in the location finding service.

The processor 120 according to various embodiments may be configured to allocate group account identification information corresponding to the generated group account, to request, to the server, to register the first account and the second account as group members based on user identification information of the first account, user identification information of the second account, and the group account identification information, and to receive a list of device identification information corresponding to devices registered with the first account and the second account from the server.

The processor 120 according to various embodiments may be configured to provide the group account identification information and the device identification information list to the second electronic device.

The processor 120 according to various embodiments may be configured to connect to a short-range communication device through the communication module, and to transmit the group account identification information and the device identification information list to the short-range communication device so as to update the configuration information configured in the short-distance communication device in relation to the location finding service after the group account is generated.

The processor 120 according to various embodiments may be configured to request location information related to the location finding service to the short-distance communication device upon requesting a connection with the short-range communication device, to receive configuration information stored in the short-distance communication device from the short-distance communication device, and to complete a connection with the short-range communication device while maintaining a user account stored in the configuration information of the short-distance communication device when information matching a group account stored in the electronic device or the first account of the electronic device is included in the configuration information of the short-range communication device.

Figure 5:
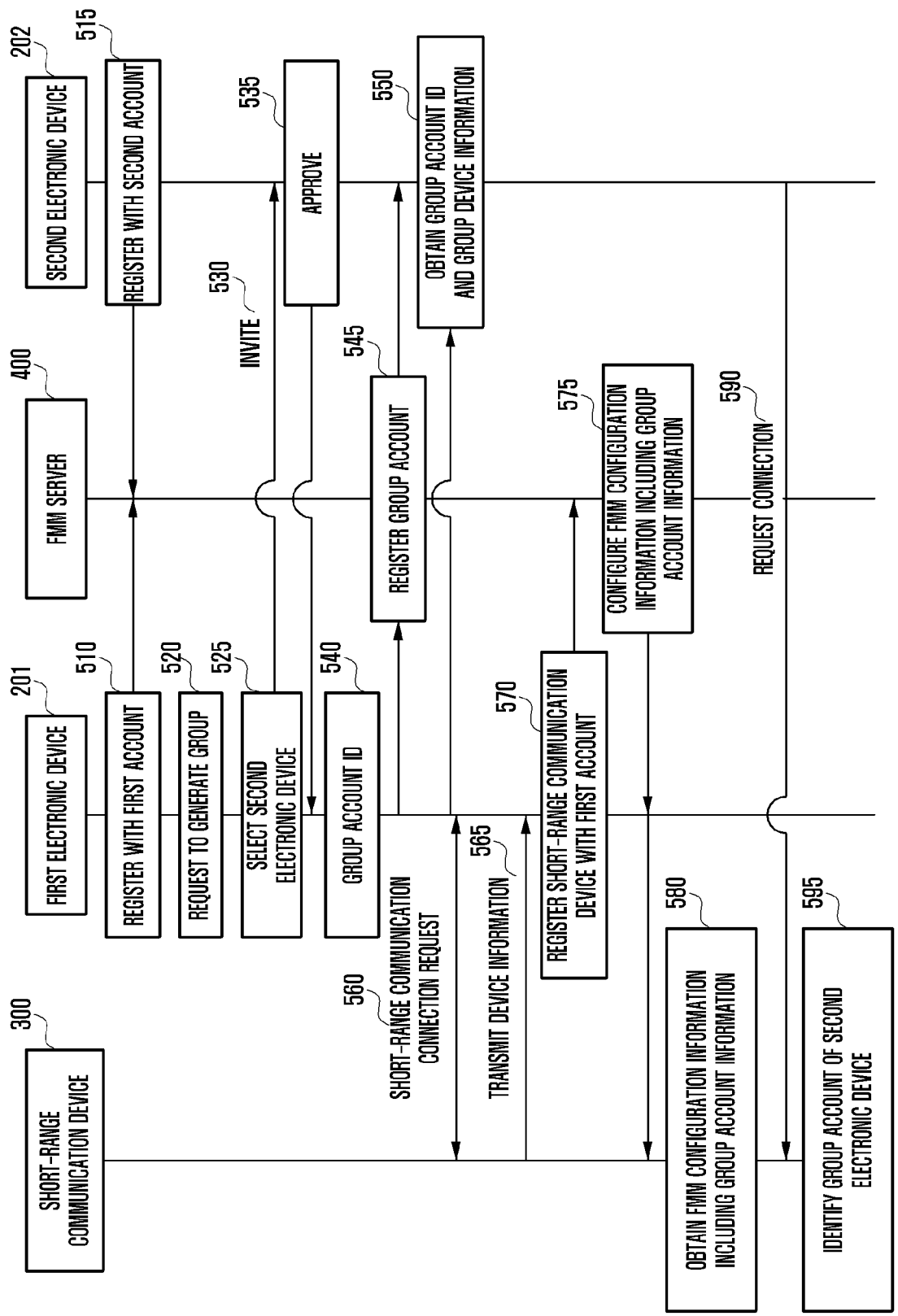
FIG. 5 illustrates a method of managing electronic devices based on a group account according to an embodiment of the disclosure.

FIG. 5 illustrates a method of managing electronic devices based on a group account according to an embodiment of the disclosure.

Referring to FIG. 5, according to an embodiment, in operation 510, a first electronic device 201 (e.g., the electronic device 101 of FIG. 1) may be registered in an FMM server (e.g., the server 400 of FIG. 4) with a first account. For example, the FMM server 400 may be a server that provides a location identification service based on a group account, but it is not limited thereto.

According to an embodiment, the first electronic device 201 may execute an application supporting a location identification service based on a group account and access the FMM server 400 through the application. The first electronic device 201 may perform an authentication procedure of the first electronic device 201 (in other words, input account information and password of the server or input biometric information) through the application to be registered and log in to the FMM server 400 with a first account.

The FMM server 400 may permit access of the first electronic device 201 having the authority by an authentication procedure, and register and manage user identification information (e.g., user 1 ID) corresponding to the first account and device identification information (e.g., user 1 ID-device 1 ID) of the first electronic device 201.

Independently or in parallel, in operation 515, a second electronic device 202 may be registered in the FMM server 400 with a second account. The second electronic device 202 may be registered in the FMM server 400 with the second account. The FMM server 400 may register and manage user identification information (e.g., user 2 ID) corresponding to the second account and device identification information (e.g., user 2 ID-device 2 ID) of the second electronic device 202.

In operation 520, the first electronic device 201 may receive an input requesting to generate a group account.

For example, the first electronic device 201 may display a group generation user interface (UI) on the display through an application supporting a location identification service based on a group account, and receive a user input for selecting a group generation item.

In operation 525, the first electronic device 201 may receive an input for selecting a second electronic device so as to invite as a group account member.

For example, the first electronic device 201 may request contact information (e.g., a contact list stored in the electronic device or a user account list subscribed to the FMM server), and receive a user input for selecting a group account member (e.g., a second electronic device or a second account) among the contact information.

In operation 530, the first electronic device 201 may transmit a message for inviting as a group member to the selected second electronic device in response to a user input.

According to some embodiments, when a pre-generated group account exists, the first electronic device 201 may support a function of selecting the second electronic device as a member of the pre-generated group account.

In operation 535, the second electronic device 202 may receive an input for approving a group invitation of the first electronic device 201, and transmit an invitation approval message to the first electronic device 201.

For example, the second electronic device 202 may include and transmit user identification information (e.g., user 2 ID) and device identification information (e.g., device 2 ID) corresponding to user account information (e.g., second account) in the invitation approval message.

In operation 540, the first electronic device 201 may generate a group account including the first account and the second account in response to the invitation approval message and allocate a group account ID (GROUP ID) to the group account.

In operation 545, the first electronic device 101 may register a first account thereof and a second account of the second electronic device 202 as members of a group account, and transmit information on the group account to the FMM server 400.

The FMM server 400 may manage user and device information based on the group account. Table 1 represents an example of group account information.

TABLE 1

| GROUP ID | USER ID | DEVICE ID |
|---|---|---|
| FG00000001 | A3823bc12a | 12:23:45:CD:1A:27 |
| | B23Lkg34jb | 67:2A:77:DF:6F:12 |
| | CaK03aZ12c | AD:FD:86:1C:34:5A |
| FG00000002 | D23ab1z12k | 76:1A:2D:EA:2C:33 |
| | Ea3fzlKZZG | 88:2C:22:71:A9:DF |
| ... | ... | ... |

In operation 550, the second electronic device 202 may obtain group account identification information and group account device information from at least one of the first electronic device 201 or the FMM server 400. For example, the second electronic device 202 may obtain at least one of group account identification information (group ID), a user identification information list registered as a member of the group account, or a device identification information list connected to the group account.

Independently, in parallel, or sequentially, from operations 510 to 550, in operation 560, the first electronic device 201 may receive a short-range communication connection request from a short-range communication device 300.

For example, a short-range communication channel may be a device-to-device connection such as Bluetooth or Wi-Fi direct, but it is not limited thereto. The short-range communication device 300 is a device that does not include a direct communication function with a server, and may include, for example, a mouse, earphone, earbuds, wearable device, stylus pen, and/or a Bluetooth device, but this is only an example, but the disclosure is not limited thereto.

In operation 565, the short-range communication device 300 may transmit device information to the first electronic device 201 in response to a communication connection request with the first electronic device 201.

Device information on short-range communication devices may include at least one of a device type (e.g., smart watch, tablet PC, stylus pen), device identification information (e.g., model name or device ID), device manufacturer, device hardware information (e.g., processor performance, memory capacity, battery capacity), software information (e.g., operating system type and version, firmware information, installation application information, support service information), communication performance information (e.g., whether Bluetooth is supported, whether BLE is supported, whether UWB is supported, whether cellular is supported, whether Wi-Fi is supported, whether NFC is supported, and/or whether MST is supported), or configuration information.

In some embodiments, the first electronic device 201 may transmit device information thereof to the short-range communication device 300.

In operation 570, the first electronic device 201 may request to register the short-range communication device 300 in the FMM server 400 based on the first account.

For example, the first electronic device 201 may transmit device information on the short-range communication device 300 to the FMM server 400 and request to register the short-range communication device 300 in the FMM server 400 with the first account.

The FMM server 400 may register the short-range communication device 300 with the first account and manage the short-range communication device 300 as a device registered with the first account. The FMM server 400 may add device identification information of the short-range communication device 300 to the device list of the first account.

According to some embodiments, the FMM server 400 may transmit a notification notifying that the short-distance communication device 300 has been registered with the first account to the first electronic device 201 (or the short-range communication device 300).

In operation 575, the FMM server 400 may configure FMM configuration information by including group account information based on registration of the short-range communication device 300 with the first account.

In an embodiment, operations 570 to 575 may refer to an onboarding process or a registration process of the short-range communication device 300. For example, the onboarding process may be a process of registering and storing device identification information of the short-range communication device 300 connected to (or paired with) the first electronic device 201 in the FMM server 400.

FMM configuration information may be configured in a process of registering the short-range communication device 300 in the FMM server 400 or in an onboarding process. For example, the FMM configuration information may include a token including at least one of a serial number, whether offline location finding is supported, or device ownership authentication information.

According to an embodiment, when the electronic device (or the first account) for registering the short-range communication device is included in the group account, the FMM server 400 may configure FMM configuration information by including the group account information. Table 2 represents an example of FMM configuration information including group account information.

TABLE 2

```
"data":{
   "model_name": "${brand name}",
   "model_number": "${model name}",
   "nickname": "$(Display name)",
   "serial_number":"${s/n}",
   "isConnected":  {true/false},
   "regDate":   "$(unixtime stamp)",
   "battery": 25,
   "fwVer":   "${firmware version}",
   "supportOprtList":   ["SET_DEVICE_INFO"]
   "config": {
      "sn": "R1234567890",
      "token": "{familyinfo}:IMEI:123456789012345",
      "offline": "Y",
      "e2ee": "N",
```

A model name, model number, nickname, and serial number may mean device identification information. A supportOprtList field may add an operation list in which the short-range communication device 300 interworks with the FMM server 400. For example, when the short-range communication device 300 is a stylus pen device type, a function of blinking a light emitting diode (LED) of the stylus pen device without sounding may be added to a supportOprtList. As another example, when the short-range communication device 300 is a wireless earbud type, a function of outputting a warning notification sound may be added to a supportOprtList.

In case that an offline field of the group account information is Y, it may mean a state that a function of transmitting a broadcasting packet is configured to find a lost device is configured in offline (in other words, a situation in which there is no Internet connection), and when an offline field of the group account information is N, it may mean a state configured not to transmit a broadcasting packet in order to find a lost device in an offline situation.

When the electronic device (or the first account) that registers the short-range communication device 300 is not included in the group account, the FMM server 400 according to some embodiments may configure FMM configuration information that does not include group account information.

In operation 580, the short-range communication device 300 may obtain and store FMM configuration information including group account information through the first electronic device 201. The short-range communication device 300 may complete an operation for a communication connection based on the FMM configuration information.

Independently or in parallel, in operation 590, the second electronic device 202 may request a connection with the short-range communication device 300 registered with the first account in the FMM server.

When a connection request is made, the second electronic device 202 may transmit device information thereof to the short-range communication device 300. The second electronic device 202 may be a device registered with a group account of the first electronic device (or first account).

In operation 595, the short-range communication device 300 may identify whether the second electronic device 202 is a device registered with a group account of the first electronic device 201.

For example, when the second electronic device 202 is included in the group account of the first electronic device, the short-range communication device 300 may be connected to the second electronic device 202 while maintaining the registration of the first account.

For another example, in case that the second electronic device 202 is not included in the group account of the first electronic device 201, the short-range communication device 300 may perform an operation of registering the second electronic device 202 as a new owner with a second account.

Figure 6:
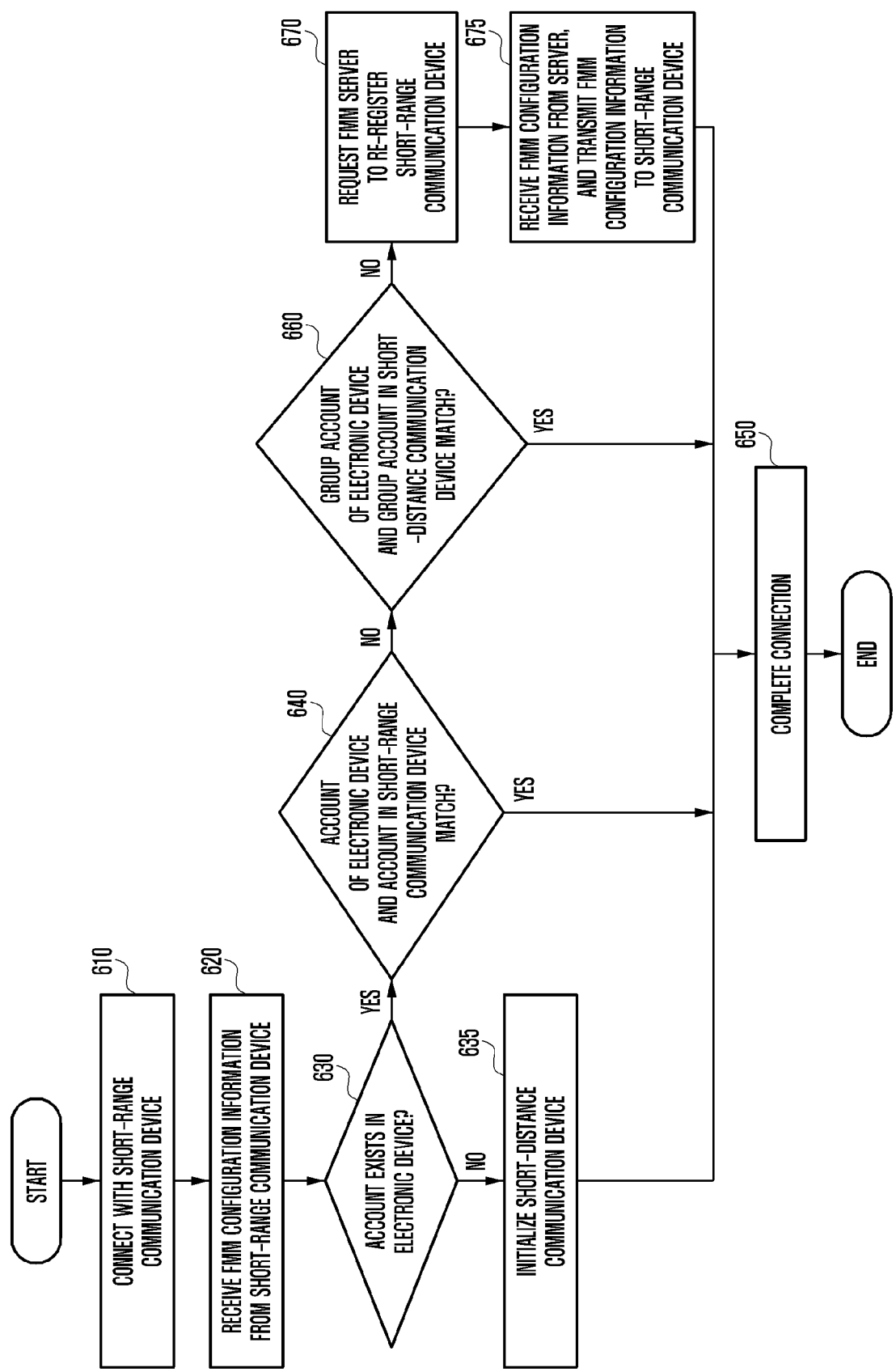
FIG. 6 illustrates a method of processing a connection with a short-range communication device based on a group account in an electronic device according to an embodiment of the disclosure.

FIG. 6 illustrates a method of processing a connection with a short-range communication device based on a group account in an electronic device according to an embodiment of the disclosure.

Referring to FIG. 6, according to an embodiment, a processor (e.g., the processor 120 of FIG. 1) of an electronic device (e.g., the electronic device 101 of FIG. 1, the first electronic device 201 of FIG. 2, the electronic device 301 of FIG. 3, or the first electronic device 201 of FIG. 5) may receive a connection request with a short-range communication device (e.g., the electronic device 102 of FIG. 1, the short-range communication device 300 of FIG. 2, the short-range communication device 302 of FIG. 3, or the short-range communication device 300 of FIG. 5) in operation 610.

When a connection with the short-range communication device is requested, the processor 120 may request FMM configuration information on registration of a location finding service (e.g., find my mobile (FMM)).

In operation 620, the processor 120 may receive configuration information from the short-range communication device.

For example, in the description of FIG. 6, a situation in which FMM configuration information is previously stored in the short-range communication device (or a situation in which the short-range communication device has a registered history in the FMM server) will be described as an example. When the short-distance communication device has a previous connection history with the electronic device, the FMM configuration information configured in a process of registering in the FMM server with a user account of the previously connected electronic device may be stored.

In some cases, when the short-range communication device has no previous connection history with the electronic device, the short-range communication device may be in a state in which FMM configuration information is not stored. In this case, when a short-distance communication device that has not been registered in the FMM server is initially registered, the short-distance communication device may be registered in the FMM server with a user account of the electronic device first connected to the short-range communication device, and FMM configuration information may be stored in the short-distance communication device.

In operation 630, the processor 120 may identify whether a user account related to the location finding service exists in the electronic device.

For example, the processor 120 may identify whether data authenticated by registering a user account related to the FMM server is stored or whether a group account generated in relation to the user account is stored.

In operation 635, when a user account does not exist in the FMM server with respect to the electronic device connected to the short-range communication device, the processor 120 may request initialization to the server and the short-distance communication device.

For example, a case in which the short-distance communication device stores FMM configuration information and has a history registered in the FMM server, but in which the electronic device does not have a registered history in the FMM server corresponds to a case in which the previous connection history of the short-distance communication device is not required; thus, the electronic device may request initialization of the short-range communication device, and the FMM server may request to delete information on the short-range communication device. Thereafter, the short-range communication device may perform a procedure for initial connection and registration with the electronic device.

In operation 640, when a user account exists in relation to the server (e.g., FMM server), the processor 120 may identify whether the user account of the electronic device and the user account registered in the short-range communication device match.

For example, when the short-distance communication device has a history registered in the FMM server by a previous connection history, device ownership authentication information included in the FMM configuration information may be generated based on a user account of a previously connected electronic device. The processor 120 may compare FMM configuration information of the short-range communication device with FMM-related information stored in the electronic device to identify whether a user account of the electronic device and a user account that registers the short-range communication device match (or are the same).

In operation 650, when the user account of the electronic device and the user account registered in the short-range communication device match, the processor 120 may complete a connection with the short-range communication device.

For example, when the processor 120 is registered with a first user account and the short-range communication device is also registered with a first account, the same user account (in other words, the owner of the short-range communication device) is used; thus, the processor 120 may complete a connection with the short-range communication device while maintaining an account of the short-range communication device.

In operation 660, a user account exists in relation to the server (e.g., FMM server), but when a user account of the electronic device and a user account that registers the short-range communication device are not the same, the processor 120 may identify whether a group account of the electronic device and a group account configured in the short-distance communication device match.

By comparing a group account registered corresponding to the user account and group account information included in the FMM configuration information of the short-range communication device, the processor 120 may identify whether the group account of the electronic device and the group account of the short-range communication device match.

When the group account configured in the electronic device and the group account stored in the short-range communication device match, the processor 120 may complete a connection with the short-range communication device in operation 650.

For example, the electronic device has been registered with a first account and the short-range communication device has been registered with a second account, but when the first account and the second account are included in the same account group, the short-range communication device may complete a connection with the electronic device while maintaining the second account.

In operation 670, when user accounts of the electronic device and the short-range communication device do not match and the group accounts do not match, the processor 120 may request the FMM server to re-register the short-range communication device with the user account of the electronic device. In operation 675, the processor 120 may receive FMM configuration information configured in a re-registration process of the short-range communication device from the FMM server, and transmit the FMM configuration information to the short-range communication device.

The processor 120 may transmit new FMM configuration information to the short-range communication device to request to reconfigure the FMM configuration information. The short-distance communication device may be updated with FMM configuration information configured with a new user account. After the short-range communication device is updated with the new user account, the processor 120 may complete a connection with the short-range communication device in operation 650.

FIGS. 7A, 7B, 7C, and 7D illustrate a method of processing a connection between an electronic device and a short-range communication device in a network system according to various embodiments of the disclosure.

Referring to FIG. 7A, according to an embodiment, an electronic device 201 (e.g., the electronic device 101 of FIG. 1, the first electronic device 201 of FIG. 2, the electronic device 301 of FIG. 3, or the first electronic device 201 of FIG. 5) may perform an operation of registering (in other words, add a device) a short-range communication device 300 in a location finding service server (e.g., FMM server 400) in a connection process with the short-range communication device 300 in operation 710.

For example, the short-range communication device 300 may include a wearable device (e.g., wireless audio device, smart watch, Bluetooth device, lost child prevention device) capable of short-range wireless communication (e.g., Bluetooth or Bluetooth low energy (BLE)) or an input device (e.g., stylus pen).

In operation 715, when connected to the short-range communication device 300, the plug-in (e.g., the short-range communication plug-in 310 of FIG. 3) of the electronic device 201 may transfer information for a device registration procedure in the FMM server 400 to the processor (e.g., the processor 120 of FIG. 1). For example, the processor 120 may generate an intent for connection and device registration processing in relation to the location finding service and execute a device registration process based on the generated intent.

In operation 720, the processor 120 may provide a signal for requesting device information on the short-range communication device 300 to the plug-in, and the plug-in may request FMM configuration information related to the location finding service to the short-range communication device 300 in operation 725.

In operation 730, when FMM configuration information is stored in the short-range communication device, the short-range communication device 300 may transmit the FMM configuration information to the electronic device 201 through the plug-in, and in operation 735, the plug-in may transfer device information of the short-range communication device 300 and FMM configuration information to the processor.

In operation 737, the processor 120 may identify the FMM configuration information provided from the short-range communication device.

The processor 120 may identify conditions for FMM configuration information and information on the electronic device related to the location finding service, and perform different procedures according to the conditions to complete an interworking process with the short-distance communication device.

Figure 7B:
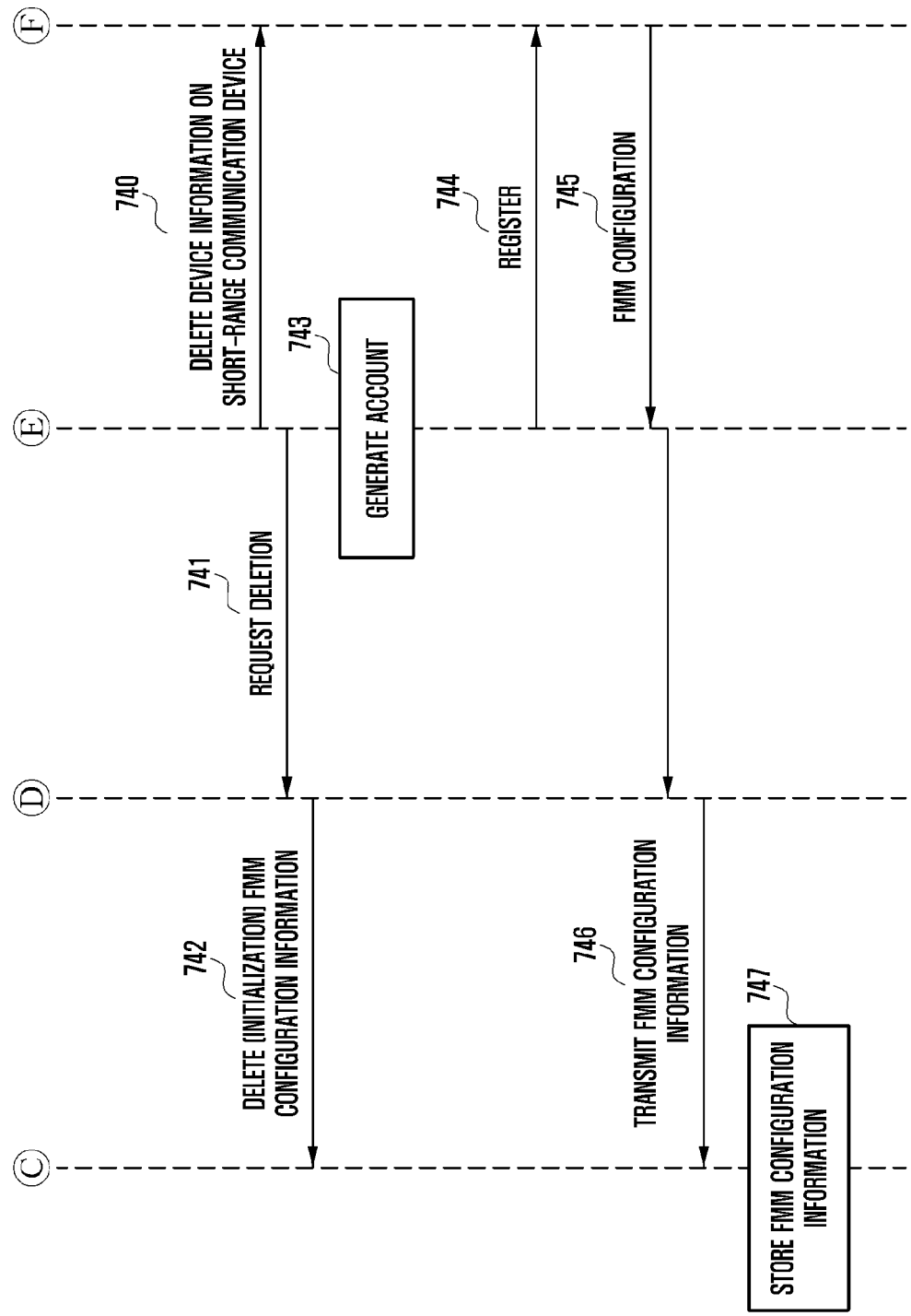

As an example, FMM configuration information exists in the short-range communication device, but when a user account for the location finding service server of the electronic device does not exist (in other words, condition 1), the processor 120 may proceed to a process of FIG. 7B.

Figure 7C:
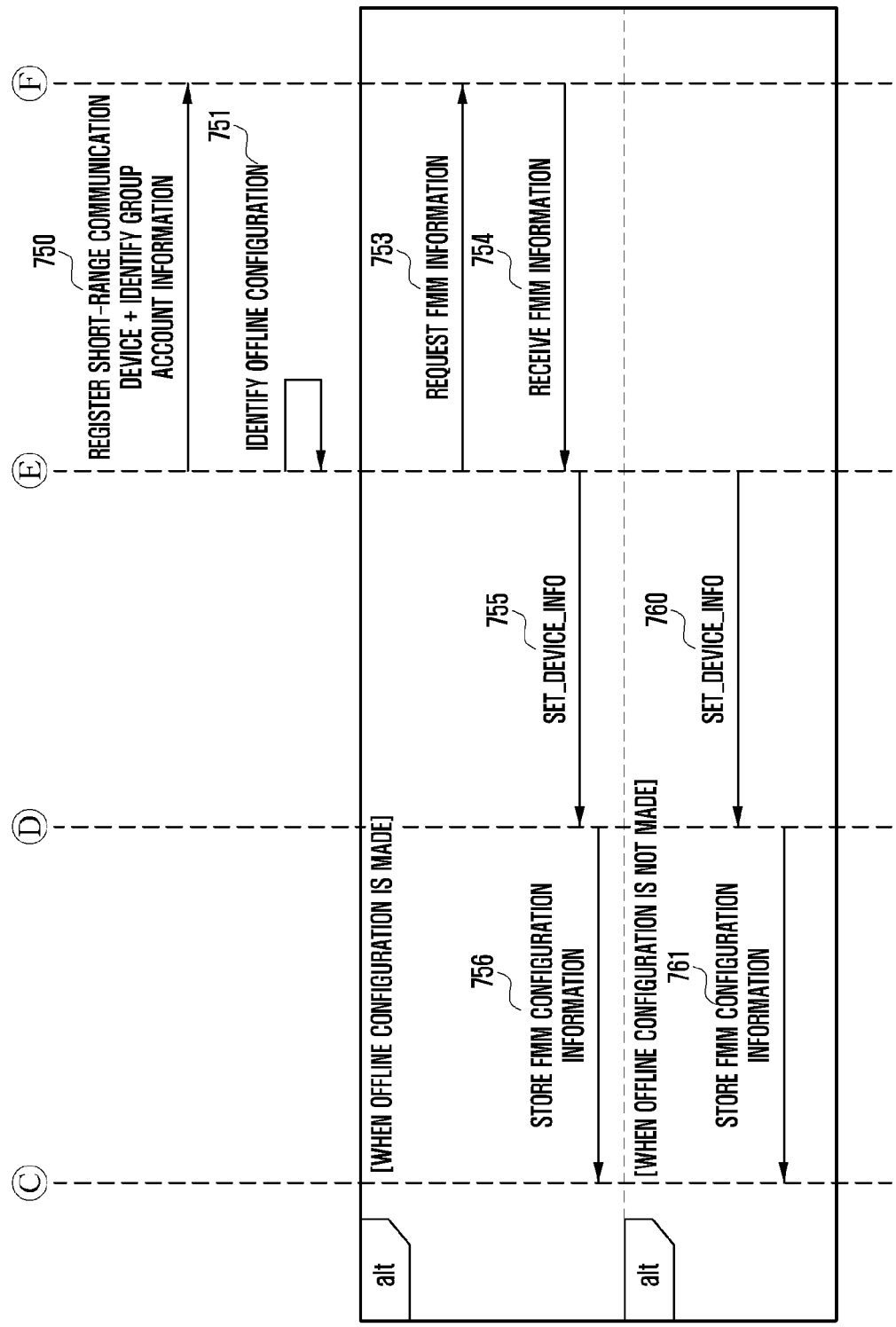

As another example, in case that FMM configuration information does not exist and a user account for the location finding service server of the electronic device 201 exists (in other words, condition 2), the processor 120 may proceed to a process of FIG. 7C.

Figure 7D:
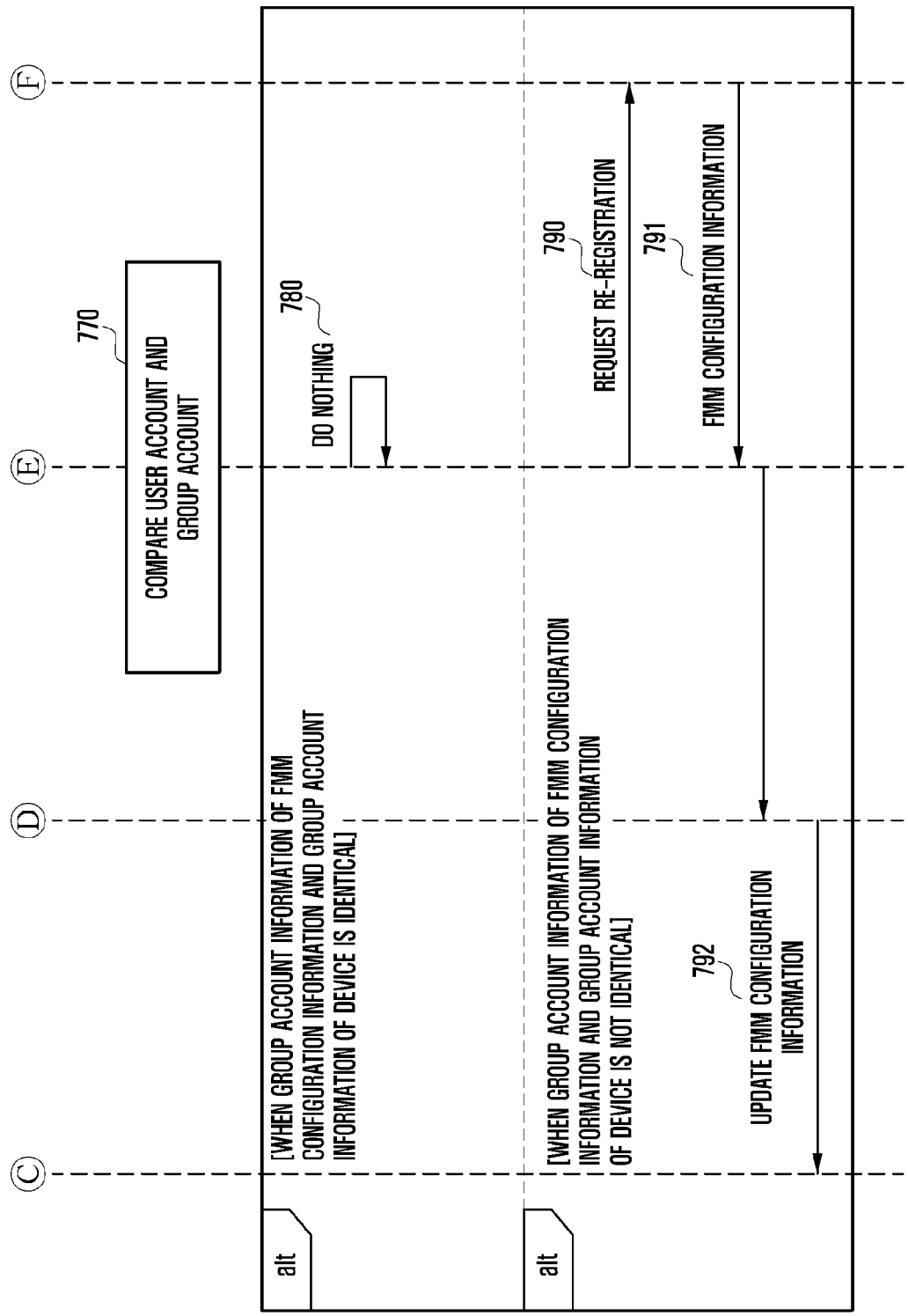

As another example, when FMM configuration information exists and a user account for the location finding service server of the electronic device 201 exists, the processor 120 may proceed to a process of FIG. 7D.

Referring to FIG. 7B, FMM configuration information exists in the short-range communication device 300, but when a user account of the electronic device 201 does not exist in the FMM server 400 (in other words, condition 1), the processor 120 may request to delete device information on the short-range communication device 300 to the server 400 in operation 740. The server 400 may delete the stored record of the short-distance communication device.

In operation 741, the processor 120 may request deletion of the FMM configuration information to the short-range communication device 300 through the plug-in, and in operation 742, the plug-in may request to delete (in other words, initialization) the FMM configuration information to the short-range communication device 300.

In this case, because the short-range communication device 300 has FMM configuration information, the short-range communication device 300 may be understood as a device with a previous FMM-related connection history. The short-range communication device 300 may initialize information on a user account and connection history related to the FMM.

In operation 743, the processor 120 may generate a user account for the server 400, and in operation 744, the processor 120 may register the electronic device 201 and the short-range communication device 300 in the FMM server 400 based on the user account. According to an embodiment, the processor 120 may request the server 400 to generate a group account along with generation of the user account and to manage devices of the location finding service based on the group account.

In operation 745, the processor 120 may receive information related to FMM configuration from the server 400, and in operation 746, the processor 120 may transmit the FMM configuration information to the short-range communication device 300 through the plug-in. In operation 747, the short-range communication device 300 may store FMM configuration information configured based on information registered with a user account newly generated in the electronic device 201.

Referring to FIG. 7C, when FMM configuration information does not exist in the short-range communication device 300 and a user account for the location finding service server (i.e., FMM server 400) of the electronic device 201 exists (in order words, condition 2), in operation 750, the processor 120 may request registration of the short-range communication device 300 and identification of the group account to the server 400.

In operation 751, the processor 120 may identify whether a location finding service may be configured by offline in the electronic device 201.

In operation 753, when the electronic device 201 may be configured by an offline, the processor 120 may request information on an FMM configuration to the server 400 for a location finding service operation in an offline state. In operation 754, the processor 120 may receive information on the FMM configuration from the server 400.

According to an embodiment, the electronic device 201 may store group account information on a user account. According to another embodiment, the electronic device 201 may request the server 400 to identify devices included in the group account related to the user account. For example, the electronic device 201 may provide device identification information of the short-range communication device 300 to the server 400, and the server 400 may identify whether the short-range communication device 300 is a device registered with a user account or a device registered with a group account based on the device identification information of the short-range communication device 300 and provide the result to the electronic device 201.

In operation 755, the processor 120 may request an FMM configuration through the plug-in based on group account information and FMM configuration information transmitted from the server 400, and in operation 756, the processor 120 may transmit FMM configuration information and group account information through the plug-in to the short-range communication device 300. The short-range communication device 300 may store FMM configuration information and group account information.

In operation 760, when the electronic device 201 may not be configured by an offline, the processor 120 may request an FMM configuration with the group account and FMM configuration information configured in the electronic device 201 without communication with the server 400, in operation 761, the processor 120 may transmit FMM configuration information and group account information to the short-range communication device 300 through the plug-in. The short-range communication device 300 may store FMM configuration information and group account information.

Referring to FIG. 7D, when FMM configuration information exists in the short-range communication device 300 and a user account for the location finding service server (i.e., FMM server 400) of the electronic device 201 exists (in order words, condition 3), the processor 120 may compare at least one of user account or group account information of the short-range communication device 300 and the electronic device 201 in operation 770.

In operation 780, when a group account of the FMM configuration information stored in the short-range communication device 300 and a group account of FMM configuration information of the electronic device 201 match, the processor 120 does nothing, that is, may complete a connection with the electronic device 201 while maintaining the account that registers the short-range communication device 300. User accounts of the electronic device 201 and the short-range communication device 300 may be different, but when they are registered as a family account, the processor 120 may complete a connection with the electronic device 201 and the short-range communication device 300 without performing a separate action.

According to some embodiments, when a user account of the FMM configuration information stored in the short-range communication device 300 and a user account of the electronic device 201 match (in order words, the same owner), the processor 120 does nothing and may complete a connection with the electronic device 201.

In operation 790, when a group account of FMM configuration information stored in the short-range communication device 300 and a group account of FMM configuration information of the electronic device 201 do not match or when a user account of FMM configuration information stored in the short-range communication device 300 and a user account of the electronic device 201 do not match, the processor 120 may request re-registration of the short-range communication device 300 to the server 400. The processor 120 may request the server 400 to change ownership authentication of the short-range communication device 300, and request to re-register the short-range communication device 300 with the current user account of the electronic device 201.

In operation 791, the server 400 may re-register the short-range communication device 300, reconfigure information on FMM configuration by re-registration, and transmit the reconfigured information to the electronic device 201. In operation 792, the electronic device 201 may transmit the FMM configuration information to be updated to the short-range communication device 300 through the plug-in. The short-range communication device 300 may be updated with the FMM configuration information transmitted from the electronic device 201.

Figure 8:
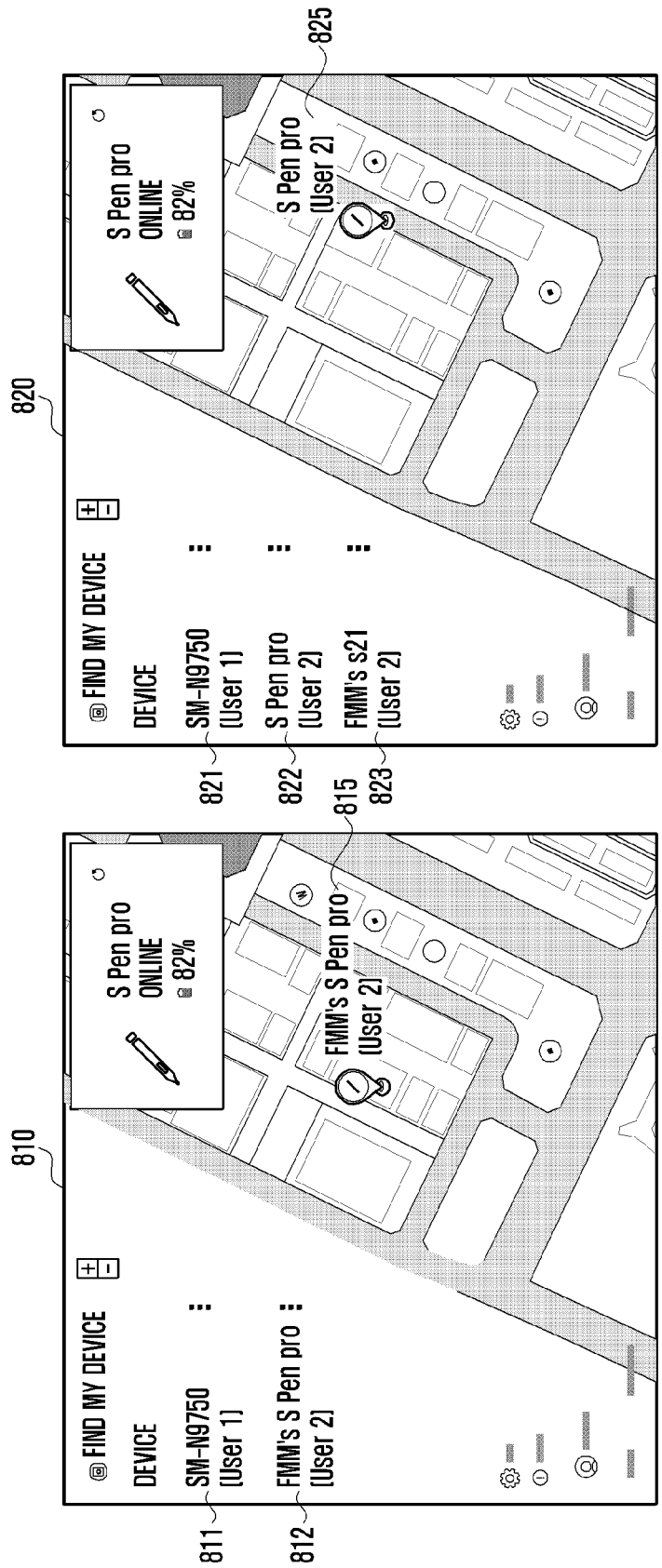
FIG. 8 illustrates a user interface for identifying locations of devices included in a group account in an electronic device according to an embodiment of the disclosure.

FIG. 8 illustrates a user interface for identifying locations of devices included in a group account in an electronic device according to an embodiment of the disclosure.

Referring to FIG. 8, a first screen 810 and a second screen 820 illustrated in FIG. 8 may be execution screens of an application supporting a location identification service. The electronic device 101 may provide information on devices registered in a user account and all devices registered in other user accounts included in the group account. For example, the electronic device 101 may display items corresponding to devices registered therein in the form of a list.

According to an embodiment, a first electronic device (e.g., SM-N9750) may be registered with a first user account (e.g., user 1) and a first short-range communication device (e.g., s-pen pro) may be registered with a second user account (e.g., user 2), and the first user account and the second user account may be configured as one group account.

The first screen 810 may be a screen providing location information of another electronic device included in the group account. The first screen 810 may include a first item 811 indicating an electronic device (e.g., SM-N9750) registered with a first user account (e.g., user 1) and a second item 812 indicating a first short-range communication device (e.g., FMM's s pen pro) registered with a second user account (e.g., user 2) included in the group account.

A user logged in a location finding service with the first account may receive the first screen 810 from the FMM server. When the user requests location information on the second item 812, the server may provide location information 815 of a first short-distance communication device registered with a second user account of a group account rather than the first user account. A user of the first user account may identify location information of devices of other user accounts registered in the group account.

According to an embodiment, the first electronic device (e.g., SM-N9750) and the first short-range communication device (e.g., S pen pro) may be registered with the first user account (e.g., user 1), and the second electronic device (e.g., FMM's S21) may be registered with the second user account (e.g., user 2). In this case, the first short-distance communication device is registered with the first user account, but may be in a state connected to the second electronic device of the second user account (e.g., user 2) included in the group account.

The user authenticated with the first user account may receive the second screen 820 from the FMM server. The second screen 820 may include a first item 821 (e.g., SM-N9750) indicating a first electronic device registered with a first user account (user 1), a second item 822 (e.g., S pen pro) registered with a first user account (user 1), but indicating a first short-range communication device connected to a second electronic device of a second user account (user 2), and a third item 823 (e.g., FMM's S21) indicating the second electronic device registered with a second user account (user 2). When the user requests location information on the second item 822 (e.g., S pen pro), location information 825 of the first short-range communication device connected to the second electronic device of the current second user account may be provided to the user of the first user account.

Figure 9:
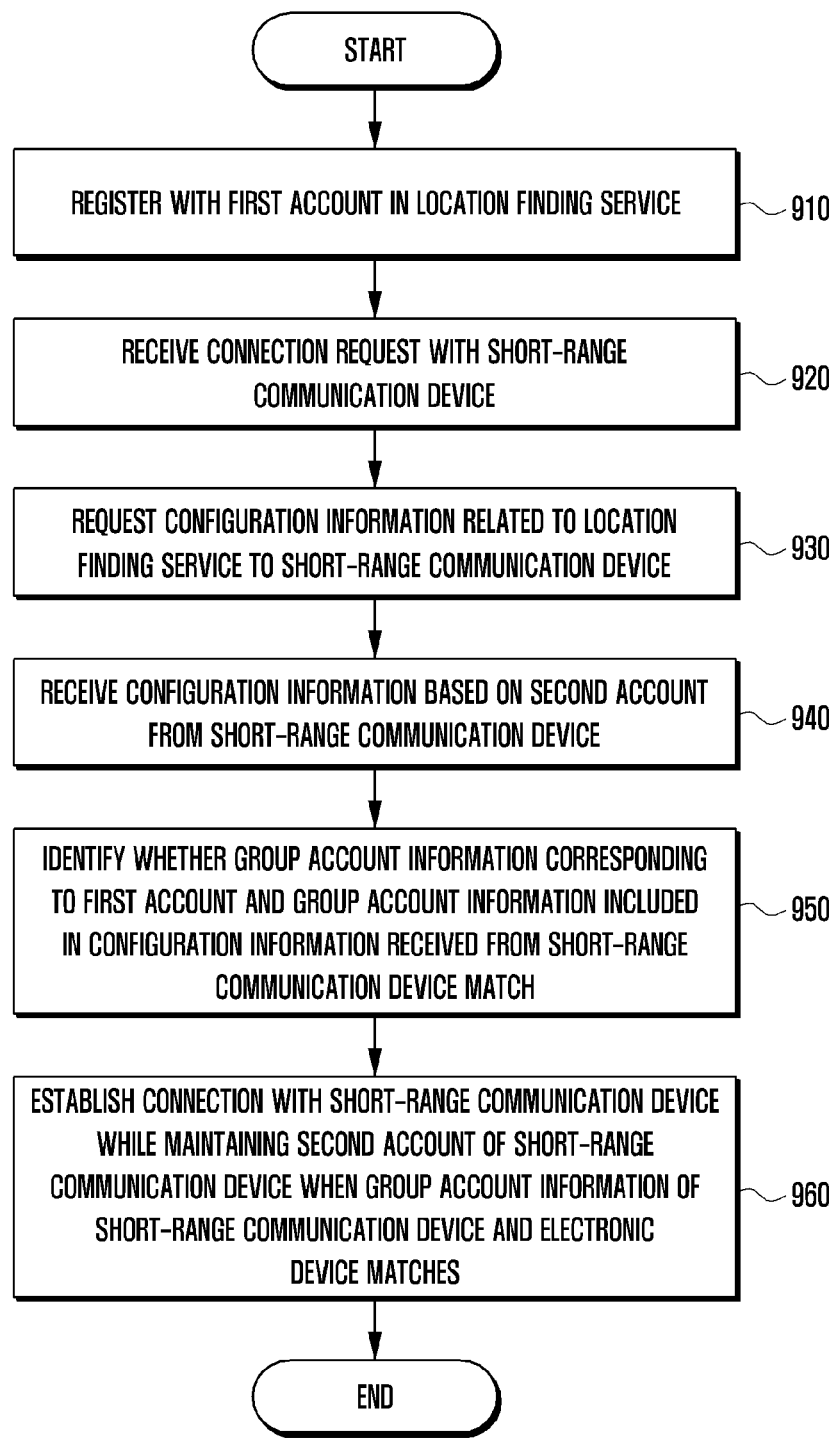
FIG. 9 illustrates a method of processing a connection between an electronic device and a short-range communication device in a network system according to an embodiment of the disclosure.

FIG. 9 illustrates a method of processing a connection between an electronic device and a short-range communication device in a network system according to an embodiment of the disclosure.

Referring to FIG. 9, according to an embodiment, a processor (e.g., the processor 120 of FIG. 1) of a first electronic device 201 (e.g., the electronic device 101 of FIG. 1, the first electronic device 201 of FIG. 2, the electronic device 301 of FIG. 3, or the first electronic device 201 of FIG. 5) may be registered with a first account in a location finding service (e.g., the FMM server 400) in operation 910.

The first electronic device 201 may execute an application supporting the location identification service based on a group account and access the FMM server 400 through the application. The first electronic device 201 may perform an authentication procedure (in other words, input account information and password of the server or input biometric information) of the first electronic device 201 through the application to be registered and log in to the FMM server 400 with a first account.

In operation 920, the processor 120 may receive a connection request with the short-range communication device (e.g., the short-range communication device 300). In operation 930, the processor 120 may request configuration information (e.g., FMM configuration information) related to the location finding service to the short-range communication device 300.

For example, the short-range communication device 300 may be in a state in which FMM configuration information is stored or in a state in which the short-range communication device 300 has a history registered in the FMM server 400. When the short-distance communication device 300 has a previous connection history with the electronic device (e.g., the second electronic device 202), the FMM configuration information configured when registering in the FMM server 400 with the user account of the previously connected electronic device may be stored.

In some cases, when there is no previous connection history with the electronic device, the short-range communication device 300 may be in a state in which FMM configuration information is not stored. In this case, when the short-range communication device 300 that has never been registered in the FMM server is initially registered, the short-range communication device 300 may be registered in the FMM server with a user account of the electronic device first connected to the short-range communication device 300, and FMM configuration information may be stored in the short-range communication device 300.

In operation 940, the processor 120 may receive configuration information based on a second account from the short-range communication device 300. The configuration information based on the second account may be FMM configuration information.

In operation 950, the processor 120 may identify whether group account information corresponding to the first account and group account information included in the configuration information received from the short-range communication device 300 matches.

In operation 960, when the group account information of the short-range communication device 300 and the electronic device 201 matches, the processor 120 may establish a connection with the short-range communication device 300 while maintaining the second account of the short-range communication device 300.

For example, the processor 120 identified that information registered in the location finding service of the electronic device 201 is the first account, and identified that the short-range communication device 300 is registered with the second account, but when the first account and the second account are included in the same account group, the processor 120 may complete a connection with the short-range communication device 300 while maintaining the second account registered in the short-range communication device 300.

Even though the short-range communication device 300 is connected to the first electronic device (e.g., 201), which is the group account, the second electronic device (e.g., 202) having the second account, which is the owner of the short-range communication device 300 may receive location information of the short-range communication device 300.

According to various embodiments, a method of managing a short-range communication device (e.g., the short-range communication device 300 of FIG. 2 and the short-range communication device 302 of FIG. 3) based on a group account in an electronic device (e.g., the electronic device 101 of FIG. 1, the second electronic device 202 of FIG. 2, and the electronic device 301 of FIG. 3) may include receiving a connection request with a short-range communication device in a state in which the electronic device is registered with a first account in a location finding service; requesting configuration information related to a location finding service to the short-distance communication device; receiving, from the short-range communication device, configuration information stored based on a second account of the short-range communication device; identifying whether group account information corresponding to the first account and group account information corresponding to the second account match; and establishing a connection with the short-range communication device while maintaining the second account of the short-range communication device in response to matching group account information of the short-range communication device and the electronic device.

According to various embodiments, the electronic device may further include re-registering, when group account information corresponding to the first account and group account information corresponding to the second account do not match, the short-range communication device with the first account in the location finding service; and providing configuration information reconfigured based on the first account to the short-distance communication device to request to update the short-distance communication device with the reconfigured configuration information.

According to various embodiments, a method of managing a short-range communication device (e.g., the short-range communication device 300 of FIG. 2 and the short-range communication device 302 of FIG. 3) based on a group account in an electronic device (e.g., the electronic device 101 of FIG. 1, the second electronic device 202 of FIG. 2, and the electronic device 301 of FIG. 3) may include executing an application supporting a location finding service; registering the electronic device with a first account in a server supporting a location finding service through the application; displaying a group account generation user interface supported by the application; displaying a contact list in response to a group generation request; transmitting an invitation message to a second electronic device of the selected member in response to a user input for selecting a group member from the contact list; generating a group account including the first account and a second account corresponding to the second electronic device in response to receiving an approval message in response to the invitation from the second electronic device; requesting, to the server, to register the first account and the second account as group members of the group account; and receiving a device identification information list corresponding to devices registered with the first account and the second account from the server.

According to various embodiments, generating a group account may further include allocating group account identification information corresponding to the generated group account, wherein requesting to register the first account and the second account with a group member of the group account may include transmitting user identification information of the first account, user identification information of the second account, and the group account identification information to the server.

According to various embodiments, the method may further include, after receiving the device identification information list, transmitting the group account identification information and the device identification information list to the second electronic device.

According to various embodiments, the method may further include, after registering the electronic device with the first account, connecting to a short-range communication device through a communication module; registering the short-range communication device in the server with a first account of the electronic device; and transmitting configuration information configured based on the first account in relation to the location finding service to the short-distance communication device.

According to various embodiments, the method may further include, after generating the group account, transmitting the group account identification information and the device identification information list to the short-distance communication device so as to update the configuration information stored in the short-distance communication device in relation to the location finding service.

According to various embodiments, the method may further include, after generating the group account, receiving a connection request with a short-range communication device; requesting configuration information related to the location finding service to the short-distance communication device; receiving the configuration information from the short-range communication device; and completing, when the configuration information of the short-range communication device includes information that matches the group account stored in the electronic device or the first account of the electronic device, a connection with the short-range communication device while maintaining the user account stored in configuration information of the short-distance communication device.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuit;
   memory, comprising one or more storage media, storing instructions; and
   a processor communicatively coupled to the communication circuit and the one or more storage media,
   wherein the instructions, when executed by the processor, cause the electronic device to:
   receive a connection request from a short-range communication device registered with a first account of a first electronic device,
   based on the connection request, request configuration information related to the short-range communication device,
   receive configuration information from the short-range communication device, the configuration information comprising device identification information of the short-range communication device, and information on a group account, wherein the group account is associated with the first account of the first electronic device,
   based on the information on the group account, identify whether a second account of the electronic device is associated with the group account,
   in case that the second account of the electronic device is associated with the group account, refrain from updating an account registration of the short-range communication device to a server and establish a short-range communication connection with the short-range communication device, and
   in case that the second account of the electronic device is not associated with the group account, request to update an account registration of the short-range communication device using the second account of the electronic device to the server with the second account and establish a short-range communication connection with the short-range communication device.

2. The electronic device of claim 1, wherein the instructions, when executed by the processor, further cause the electronic device to:
   receive configuration information reconfigured based on the second account from the server; and
   transmit the configuration information reconfigured based on the second account to the short-range communication device so as to update the short-range communication device.

3. The electronic device of claim 1, wherein the instructions, when executed by the processor, further cause the electronic device to:
request, to the server, registration of the electronic device as the second account based on an application supporting a location finding service,
display a user interface for generating a group account on the display,
display a contact list in response to a user input for generating a generation request,
transmit an invitation message to at least one second electronic device of a selected member in response to at least one user input for selecting a group member from the displayed contact list, and
generate a group account including the first account and an account corresponding to the at least one second electronic device in response to receiving an approval message from the at least one second electronic device.

4. The electronic device of claim 3, wherein the instructions, when executed by the processor, further cause the electronic device to:
generate group account identification information corresponding to the generated group account,
request, to the server, to register the first account and the account as group members based on user identification information of the first account, user identification information of the second account, and the group account identification information, and
receive a device identification information list corresponding to devices registered with the first account and the account from the server.

5. The electronic device of claim 4, wherein the instructions, when executed by the processor, further cause the electronic device to provide the group account identification information and the device identification information list to the second electronic device.

6. The electronic device of claim 4, wherein the instructions, when executed by the processor, further cause the electronic device to:
connect with a second short-range communication device through the communication circuit,
transmit the group account identification information to the short-range communication device so that configuration information configured in the second short-range communication device in relation to the location finding service is updated after generating the group account.

7. The electronic device of claim 1, wherein the instructions, when executed by the processor, further cause the electronic device to:
request, to the server, deletion of the first account related to the short-range communication device and re-registration of the electronic device and the short-range communication device when the second account related to the server is stored.

8. A method performed by an electronic device for managing a short-range communication device based on a group account in an electronic device, the method comprising:
receiving, by the electronic device, a connection request from the short-range communication device registered with a first account of a first electronic device;
based on the connection request, requesting, by the electronic device, configuration information related to the short-range communication device to the short-range communication device;
receiving, by the electronic device from the short-range communication device, the configuration information, the configuration information comprising device identification information of the short-range communication device, information on a group account, wherein the group account is associated with the first account of the first electronic device;
based on the information on the group account, identifying, by the electronic device, whether a second account of the electronic device is associated with the group account;
in case that the second account of the electronic device is associated with the group account, refraining, by the electronic device, from updating an account registration of the short-range communication device to a server and establishing, by the electronic device, a short-range communication connection with the short-range communication device; and; and
in case that the second account of the electronic device does is not associated with the group account, requesting, by the electronic device, to update an account registration of the short-range communication device using the second account of the electronic device to the server and establishing, by the electronic device, a short-range communication connection with the short-range communication device.

9. The method of claim 8, further comprising:
receiving configuration information reconfigured based on the second account from the server and transmitting the configuration information reconfigured based on the second account to the short-range communication device so as to update the short-range communication device.

10. A method performed by an electronic device for managing a short-range communication device based on a group account in an electronic device, the method comprising:
executing an application supporting a location finding service;
registering the electronic device with a first account in a server supporting a location finding service through the application;
displaying a group account generation user interface supported by the application;
displaying a contact list in response to a group generation request;
transmitting an invitation message to a second electronic device of a selected member in response to a user input for selecting a group member from the contact list;
generating a group account including the first account and a second account corresponding to the second electronic device in response to receiving an approval message in response to an invitation from the second electronic device;
requesting, to the server, to register the first account and the second account as group members of the group account; and
receiving a device identification information list corresponding to devices registered with the first account and the second account from the server.

11. The method of claim 10,
wherein generating a group account further comprises allocating group account identification information corresponding to the generated group account, and
wherein requesting to register the first account and the second account as group members of the group account comprises transmitting user identification information of the first account, user identification information of the second account, and the group account identification information to a server supporting the location finding service.

12. The method of claim 11, further comprising:
after receiving the device identification information list, transmitting the group account identification information and the device identification information list to the second electronic device.

13. The method of claim 11, further comprising:
after registering the electronic device with the first account,
connecting with a short-range communication device through a communication circuit;
registering the short-range communication device in the server with a first account of the electronic device; and
transmitting, to the short-range communication device, configuration information configured based on the first account in relation to the location finding service.

14. The method of claim 13, further comprising:
after generating the group account, transmitting the group account identification information and the device identification information list to the short-range communication device so as to update configuration information stored in the short-range communication device in relation to the location finding service.

15. The method of claim 13, wherein the group account includes a model name, a model number, a nickname, a serial number and an operation list of the short-range communication device.

16. The method of claim 15, wherein the operation list defines a list of operations by which the short-range communication device interworks with the server.

17. The method of claim 10, further comprising:
after generating the group account,
receiving a connection request with the short-range communication device;
requesting configuration information related to the location finding service to the short-range communication device;
receiving the configuration information from the short-range communication device; and
completing, when the configuration information of the short-range communication device comprises information that matches a group account stored in the electronic device or the first account of the electronic device, a connection with the short-range communication device while maintaining a user account stored in configuration information of the short-range communication device.

18. The method of claim 10, when a pre-generated group account exists, the electronic device supports a function of selecting the second electronic device as a member of the pre-generated group account.

* * * * *